UNITED STATES PATENT OFFICE.

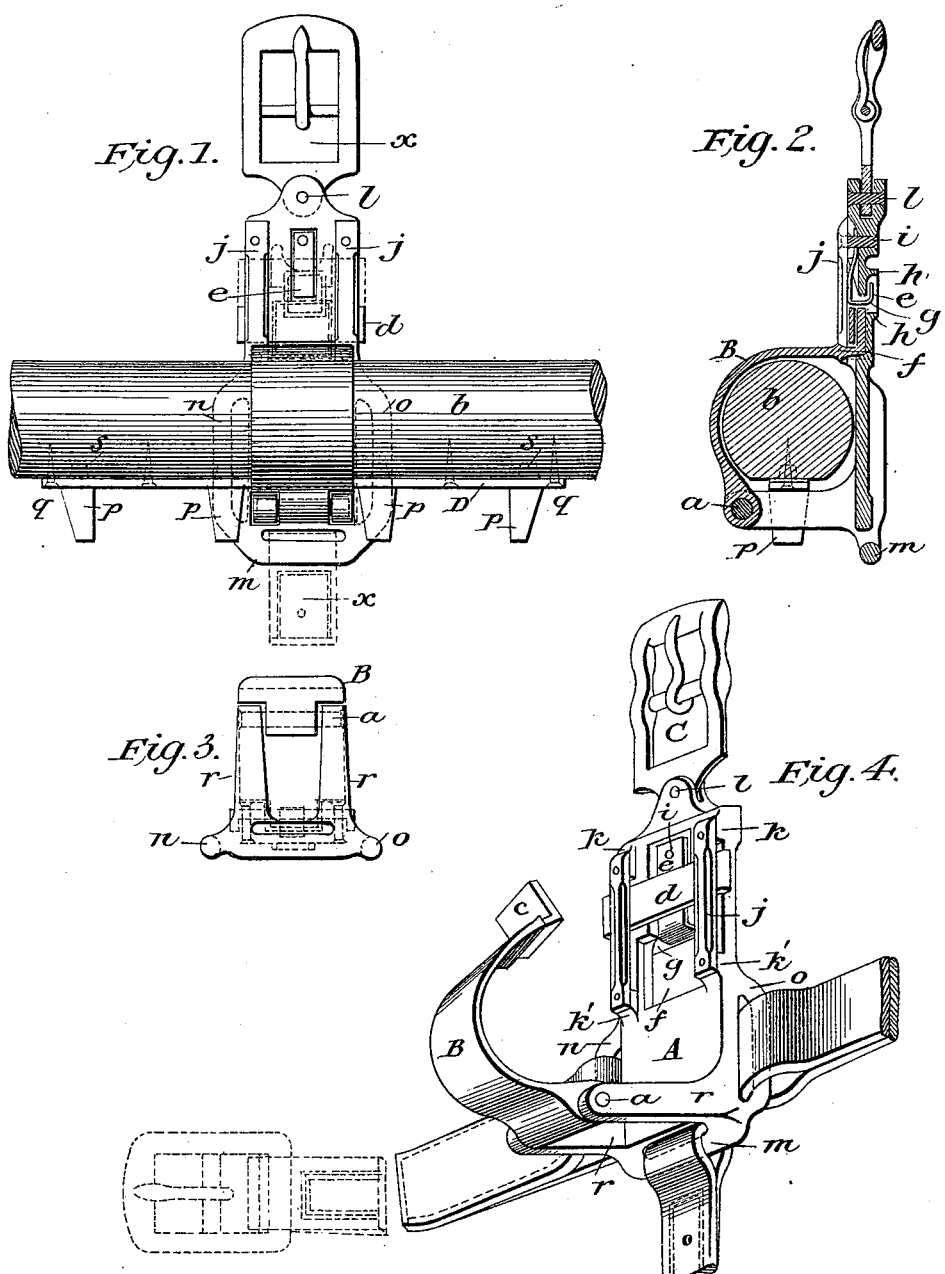

WILLIAM COLLIGAN AND MICHAEL J. DALEY, OF WATERBURY, CONNECTICUT.

SHAFT-TUG.

SPECIFICATION forming part of Letters Patent No. 619,943, dated February 21, 1899.

Application filed January 15, 1898. Serial No. 666,807. (No model.)

*To all whom it may concern:*

Be it known that we, WILLIAM COLLIGAN and MICHAEL J. DALEY, citizens of the United States, residing at Waterbury, in the county of New Haven and State of Connecticut, have invented certain new and useful Improvements in Shaft-Buckles for Harness; and we do declare the following to be a full, clear, and exact description of the invention, such as will enable others skilled in the art to which it appertains to make and use the same.

This invention relates to that portion of harness for horses by means of which the thills of a carriage or wagon are supported and by means of which the horse is attached to the carriage or wagon to draw or back it; and the object of our invention is to provide means by which the horse may be quickly attached to or detached from the thills of the carriage or wagon and dispense with the whiffletree and those parts of the harness connected therewith when the horse is attached to the carriage or wagon and with any direct connection between the holdback-straps and the thills or shafts of the carriage or wagon.

Our invention provides more simple and secure means for connecting that part of an ordinary harness by which the vehicle is drawn to the vehicle than is afforded by means now in use.

Reference is hereby made to the accompanying drawings, forming a part of this specification, in which similar letters of reference indicate corresponding parts in all the figures.

Figure 1 is a front elevation of the buckle in a closed position and a portion of the shaft secured in place. Fig. 2 is a vertical section of the buckle and shaft on the line $xx$ of Fig. 1. Fig. 3 is a plan or top view of the buckle alone. Fig. 4 is a perspective view of the buckle with tug, holdback-strap, and belly-girth attached thereto.

We make this article in two principal parts A B, with a hinge-joint $a$ to secure around the shaft $b$. The part B has a flange $c$ projecting from its upper and free end and is secured in its place when locked by the sliding bar $d$, which is held firmly in locked position by the end and in its unlocked position by the side of the spring $e$. The lower and free end of the spring $e$ is bent into hook-shaped form (shown in Fig. 2) and passes through the slot $g$ and is protected from contact with other parts of the harness by the projecting rib $h$. The upper end of the spring $e$ is firmly secured to the part A by the rivet $i$ or by any other suitable equivalent means. When in a locked position, the flange $c$ fits snugly into the depression $f$ and is secured in place by pushing the sliding bar $d$ downward until it passes over the spring $e$, when the spring will be released and immediately so extend its free end forward as to firmly prevent the sliding bar $d$ from slipping upward and releasing the part B.

To prevent the sliding bar $d$ from lateral movement, we have provided the bars $j$, which we securely rivet to the part A on the projections $k$ and $k'$, thereby also providing a space in which the bar $d$ may be moved upward when unlocking the device and downward when locking it. We bend both ends of the bar $d$ at right angles to prevent end movement and to secure it in position.

We provide the buckle C, hinged to A at $l$, to which the strap extending from the saddle of the harness may be attached. The belly-girth is attached to the loop $m$, the tug or trace to the loop $n$, and the holdback-straps to the loop $o$.

To the under side of the shaft of the carriage or wagon we secure the plate D, provided with the downwardly-projecting studs $p$ and the upward-projecting studs $s$, which are embedded into the shaft, and supplement the screws $q$ in securely fastening the plate D to said shaft.

To attach a horse bearing harness with this buckle to a vehicle the thills of which are provided with the plate with the above-described projecting studs, it is only necessary to so place the shafts on the projecting arms $r$ as to bring the projecting arms $r$ between two of the downwardly-projecting studs $p$ and then to close the part B over each shaft and push down the bar $d$.

We provide a number of the downwardly-projecting studs $p$ for the purpose of either adjusting the horse in his position with relation to his distance from the vehicle or to provide for horses of different sizes. Of the two studs on opposite sides of the arms $r$ the vehicle is drawn by the one most forward and held back by the one rearward.

We dispense with the usual harness-tug which extends backward from the breast collar or harness to the whiffletree and substitute therefor a short tug extending only from the breast collar or harness to the loop $n$ of the buckle.

We provide the hinge $l$ to give the same ease and freedom of movement which is secured by the use of the usual tug, holdback-straps, and whiffletree.

We propose to make this improved shaft-buckle of metal and to secure it to the harness by the buckle C and the loops $m$, $n$, and $o$ to form a part of the harness.

We are aware that shaft-buckles consisting of two principal parts hinged together to admit the shafts of vehicles have been made and patented and we do not claim such a construction broadly.

Having described our invention, what we do claim, and desire to secure by Letters Patent, is—

A shaft-carrier comprising a base-plate A provided with means for attachment to the coöperating parts of the harness; a pair of shaft-supporting arms projecting from the face of the base-plate; the clamping-plate B hinged at one end between said arms and having its opposite end formed to be received into a recess F suitably located on the face of the base-plate; bars $j, j$ on opposite sides of the recess and spaced from the base-plate to provide ways for the sliding latch-bar $d$, and the bar-retaining hook-shaped spring $e$ secured to the base-plate above the recess, substantially as described.

In witness whereof we hereunto affix our signatures in the presence of two witnesses.

WM. COLLIGAN.
MICHAEL J. DALEY.

Witnesses:
FRANK S. BACON,
FREDERICK M. PEASLEY.